Jan. 28, 1969

D. W. CARLSON ET AL 3,423,819

METHOD OF FORMING RELATIVELY STRAIGHT LENGTHS OF METAL INTO ELONGATED MEMBERS

Filed Dec. 12, 1966

DONALD W. CARLSON
PHILLIP E. ELLER
INVENTORS

BY John R. Faulkner
William E. Johnson
ATTORNEYS

DONALD W. CARLSON
PHILLIP E. ELLER
INVENTORS

ATTORNEYS

United States Patent Office 3,423,819
Patented Jan. 28, 1969

3,423,819
METHOD OF FORMING RELATIVELY STRAIGHT LENGTHS OF METAL INTO ELONGATED MEMBERS
Donald W. Carlson and Phillip E. Eller, Belleville, Mich., assignors to Ford Motor Company, Dearborn, Mich., a corporation of Delaware
Filed Dec. 12, 1966, Ser. No. 601,078
U.S. Cl. 29—471.1                                    8 Claims
Int. Cl. H01r 43/06; B23k 31/02

ABSTRACT OF THE DISCLOSURE

This disclosure specifically relates to a method of forming a relatively straight length of copper metal into a commutator blank of circular cross section by the following steps. First, the straight length of copper metal is formed into a circular configuration with the first end of the metal being positioned adjacent the second end of the metal in parallel, spaced relationship therewith. Second, the copper metal in the area of the two adjacent ends is electron beam welded so as to form a welded joint between the ends. Third, the circular blank is then prepared for an extrusion operation and inserted into an extrusion press. Finally, the extrusion blank is extruded to form the commutator blank of circular cross section.

---

This invention relates to a method of forming relatively straight lengths of metal into elongated members of prescribed cross section and, more particularly, to a method of forming relatively straight lengths of copper metal into commutator blanks for subsequent use in the fabrication of starting motors for motor vehicles.

In one prior method of mass producing commutators for use in starting motors of motor vehicles, the copper utilized in the individual commutators was purchased in the form of an extruded tube of circular configuration. Short lengths were severed from the tube to form individual circular blanks for producing individual commutators. The individual blanks were inserted into a die member of an extrusion press and pressure applied thereto to extrude the blank and form a commutator blank of circular configuration.

The above described method of making commutator blanks had its attendant disadvantages. More specifically, one disadvantage of the prior method is found in the fact that copper in the form of an extruded tube is substantially more expensive than copper in the form of a straight bar. A second disadvantage of the prior method is found in the fact that the shearing of the extruded tube results in considerable scrap losses.

Therefore, it is a principal object of this invention to provide a method of forming relatively straight lengths of metal into elongated members of prescribed cross section.

It is another object of this invention to provide a method of forming relatively straight lengths of copper metal into commutator blanks of circular cross section.

It is still another object of this invention to provide a method of forming relatively straight lengths of copper metal into commutator blanks of circular cross section, which method results in very low scrap losses.

It is a further object of this invention to provide a method of forming relatively straight lengths of copper into commutator blanks of circular cross section, which method is simple and efficient in operation and economical to utilize.

Commutator blanks are formed from straight lengths of copper metal having first and second ends in accordance with the method of this invention by the following steps. First, the copper metal is formed into a generally circular configuration desired for the elongated commutator blank, with one end of the length of metal positioned adjacent the other end of the length of metal in parallel, spaced relationship therewith, the spacing between the ends being such as to allow an electron beam welding operation to be performed therebetween. Second, the copper metal in the area adjacent the two ends of the length of metal is subjected to an electron beam welding operation so as to form a welded joint between the two ends whereby the length of metal forms a continuous, circular extrusion blank. Third, the extrusion blank is inserted into an extrusion press. Fourth, the extrusion blank is subjected to pressure and elongated to form the same into a commutator blank of circular cross section.

Other objects and attendant advantages of the method of the present invention may be more readily realized when the specification is considered in conjunction with the attached drawings in which.

Figure 1:
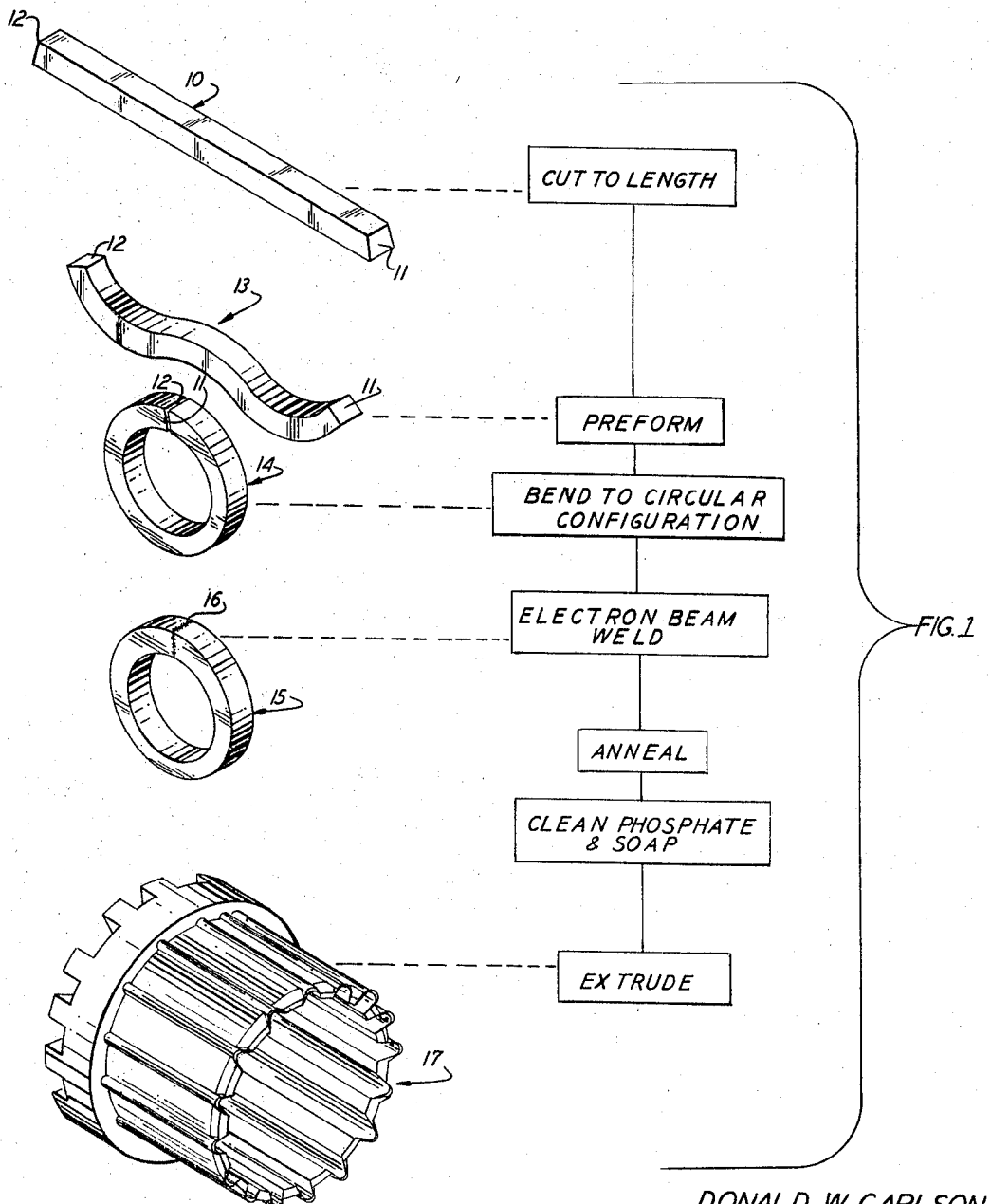
FIGURE 1 is a flow chart showing the shape assumed by the original straight length of metal after various ones of the steps of the method of this invention.

Referring now to the drawings in which like reference numerals designate like parts throughout the several views thereof, there is shown in FIGURE 1, in outline form, the steps employed in the method of this invention. FIGURE 1 also depicts the shape assumed by the originally straight length of metal after each step. While the preferred embodiment of the method of this invention is described in conjunction with the manufacture of commutator blanks of copper metal, it should be understood that the method of this invention is applicable to the formation of many various configurations of extrusion blanks from many various metals and metallic alloys.

The method of this invention, as employed in the manufacture of commutator blanks, is initiated by serving a straight length of copper from a long length of copper wire bar of generally rectangular cross section. In FIGURE 1, the straight length of copper is shown in perspective view and identified generally by the numeral 10. The ends 11 and 12 of the length of copper 10 are tapered slightly from one side to the other side to facilitate the bending of the copper into a circular configuration. Also, to facilitate the bending of the copper, the length thereof is preformed into a "Lazy W" configuration as shown in perspective view and generally identified by the numeral 13 of FIGURE 1. The "Lazy W" configuration 13 is thereafter bent into a circular configuration as shown in perspective view and generally identified by the numeral 14 of FIGURE 1. In the circular configuration 14, the first end 11 of the length bar of copper is in juxtaposed relationship to the second end 12. The cutting of the copper bar to length, tapering of the ends thereof, preforming and bending the same to a circular configuration may be accomplished on any suitable machine such as a Torrington Vertislide Machine suitably tooled for such an operation.

After the length of copper metal 10 has been bent to the circular configuration 14, an electron beam welding operation is carried out on the copper metal in the area of the ends 11 and 12 thereof so as to form a welded joint therebetween which is free from flash and has no upset portion. The utilization of the electron beam welding operation to close the gap between the ends of a straight length of copper metal 10 allows a more economical formation of an extrusion blank for extruding commutators than available in the past. The cost of bending and welding the copper metal to form the extrusion blank is far below the cost of forming extrusion blanks by purchasing extremely expensive copper tubing and thereafter severing individual blanks from the tubing.

Figure 2:
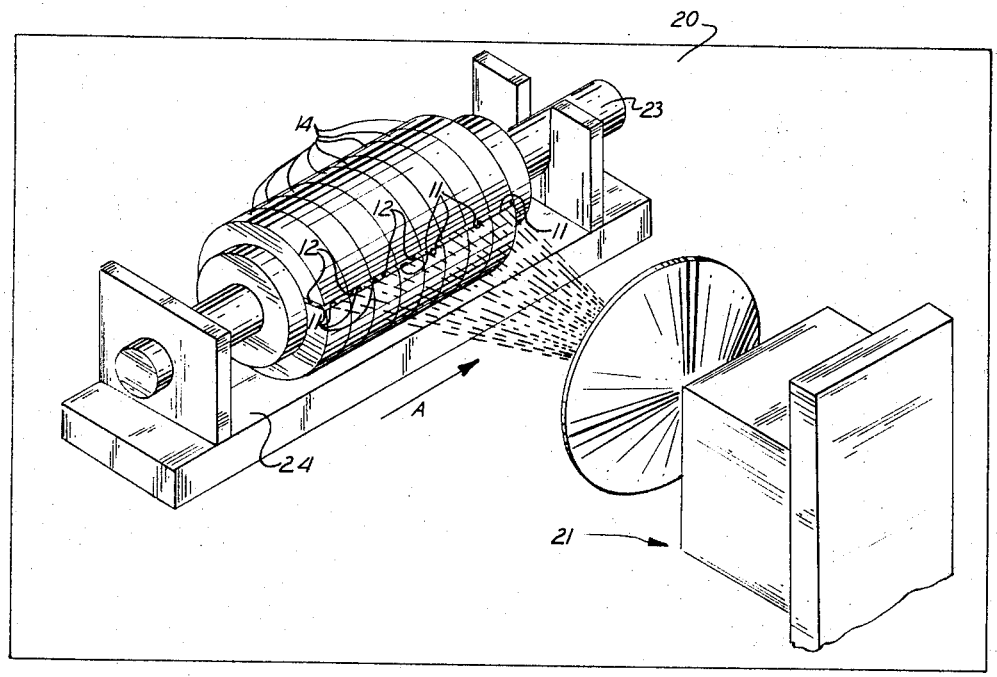
FIGURE 2 is a pictorial view illustrating a plurality of extrusion blanks mounted in an electron beam welding device.

The electron beam welding operation is described in greater detail in conjunction with the pictorial drawing of FIGURE 2. In FIGURE 2, an evacuated chamber 20 contains an electron beam welding device, generally indicated by the numeral 21. The welding device 21 is shown as being mounted so as to direct a beam of electron energy at the area of the juxtaposed ends 11 and 12 of a plurality of the extrusion blanks 14 of circular configuration. The blanks 14 are mounted with their juxtaposed ends 11 and 12 aligned laterally on a spindle 23 attached to a slide 24 which is movable in the direction of arrow A of FIGURE 2. As the plurality of blanks 14 are moved past the focused ray of the electron beam welding device 21, the focused electron beam forms a weld between the juxtaposed ends 11 and 12 of respective blanks 14. The electron beam welding operation may be carried out, for example, in an electron beam welder such as the CV–2 Electron Beam Welder produced by Sciaky Brothers, Incorporated of Chicago, Ill., and described in their Bulletin Number 350, issued April 1966. More particularly, the CV–2 Welder houses the parts to be welded in a vacuum chamber generally held in a soft vacuum, that is, a vacuum in the range of 10 to 100 microns of absolute pressure.

The electron beam welding operation produces an extrusion blank 15 (see FIGURE 1) wherein a welded joint 16 is formed between the juxtaposed ends 11 and 12 of the originally straight length of copper metal. The welded joint 16 produced by the electron beam welder is characterized by its absence of flash and lack of a bead or upset. The welded joint 16 is further characterized in that it possesses substantially homogeneous chemical and physical properties across a cross section thereof. The superior weld thus obtained by utilization of the electron beam welding operation allows the extrusion of the extrusion blank so formed without any breakage thereof at the welded joint.

After the extrusion blank 15 is formed, it is annealed at a temperature of 900° F. for 20 to 30 minutes so as to relieve all stresses and strains developed therein during both the forming and electron beam welding steps of the method of this invention. After annealing, the extrusion blank is subjected to a dilute acid rinse so as to etch the surfaces thereof. The extrusion blank is then immersed in a soap solution and the solution adheres to the etched surfaces thereof. The blank is withdrawn from the soap soluion and dried to leave a soap film adhering to the etched surfaces, the soap film serving as a lubricant for the subsequent extrusion operation.

Figure 3:
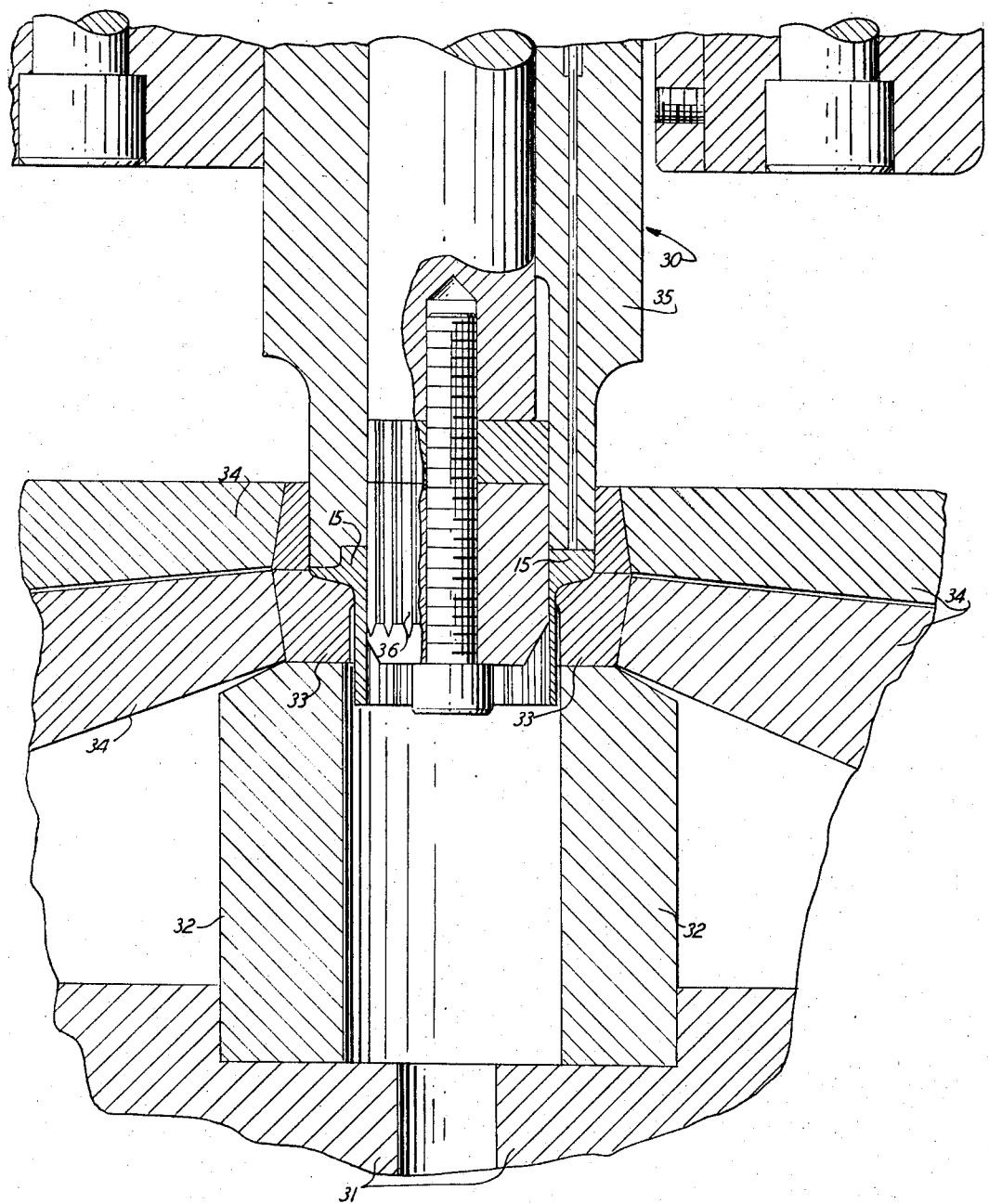
FIGURE 3 is a cross section view of a conventional type of extrusion press utilized to extrude the extrusion blanks.

After application of the soap to the extrusion blank 15, the blank is inserted into the die portion of an extrusion press. A press similar to the type generally identified by the numeral 30 in FIGURE 3 may be utilized. The extrusion press of FIGURE 3 has a base plate 31 upon which a die support member 32 is received. A die 33 is supported along its bottom surface by the member 32 and along its lateral edges by a plurality of side support members 34 which are, in turn, suitably supported from the base plate 31 by members not shown. A stripper 35 supported by suitable means (not shown) for movement relatively towards and away from the die 33, in turn, supports for movement therewith a mandrel 36.

In operation of the extrusion press 30, the extrusion blank 15 is placed on the die 33 and the stripper 35 is advanced. The mandrel 36 engages the inter-circumferential edge of the blank 15 and starts the initial deformation of the blank in a downward direction over the die 33. As is well known in the art, once the mandrel 36 starts the extrusion process, the co-movement of the stripper 35 and the mandrel 36 continues the extrusion process until the advancement of the stripper 35 is terminated and a chamber of fixed volume is defined between the stripper 35 and the die 33. The final result of the extrusion process is a commutator blank 17 as shown in FIGURE 1.

The beam welding operation forms a welded joint between the ends of the original straight length of copper of such superior quality that the welded joint is unaffected by the extrusion operation. In fact, a metallurgical examination of a cross section of the extruded commutator shows that the welded joint is undetectable after that portion of the metal forming the welded joint has been extruded past the die surfaces.

The above description has been directed to the use of the process of this invention in conjunction with the formation of straight lengths of copper metal into circular extrusion blanks for subsequent extrusion into commutator blanks. It should be understood, however, that this inventive process may be utilized in conjunction with any metal or metallic alloy which may be electron beam welded and thereafter extruded. Also, the process of this invention may be utilized in forming irregular shaped extrusion blanks such as "T" shaped blanks.

There has been disclosed herein a method of forming relatively straight lengths of metal into elongated members of prescribed cross section, which method, when applied to the formation of commutators of copper metal, results in a substantial cost savings with respect to the purchase of copper and is simple and efficient in operation.

It is apparent to one skilled in the art that the process of this invention will have many modifications thereof which fall within the true spirit and scope of the invention. It is intended that all such modifications be included within the scope of the appended claims.

What is claimed is:

1. A method of forming a relatively straight length of weldable metal having first and second end surfaces into an elongated member of circular cross section which comprises the steps of:

forming the straight length of metal into a circular configuration desired for the cross section of the elongated member with the first end of the metal being positioned adjacent the second end of the metal in parallel, spaced relationship therewith, the spacing between the ends being such as to allow an electron beam welding operation to be performed therebetween;

electron beam welding the metal in the area of said two adjacent ends to form a welded joint therebetween both free from flash and having no upset thereby to form a circular extrusion blank;

inserting said circular blank into an extrusion press; and extruding said circular blank thereby to elongate the metal and form the member of circular cross section.

2. The method of forming a relatively straight length of weldable metal having first and second end surfaces into an elongated member of circular cross section as defined in claim 1 wherein said electron beam welding operation is carried out in a vacuum of 10 to 100 microns.

3. The method of forming a relatively straight length of weldable metal having first and second end surfaces into an elongated member of circular cross section as defined in claim 2 wherein said weldable metal is copper.

4. A method of forming a relatively straight length of weldable metal into an elongated member of prescribed cross section which comprises the steps of:

forming the metal into the general configuration desired for the cross section of the elongated member with a first selected surface area of the metal being positioned adjacent a second selected surface area of the metal in parallel, spaced relationship therewith, the spacing between said areas being such as to allow an electron beam welding operation to be performed therebetween;

electron beam welding the metal in the area of said two selected, adjacent surfaces to form a welded joint therebetween thereby to form an extrusion blank;
inserting said blank into an extrusion press; and
extruding said blank thereby to elongate the metal and form the member of desired cross section.

5. A method of forming a relatively straight length of copper metal having first and second end surfaces into a commutator blank of circular cross section which comprises the steps of:
forming the straight length of copper metal into a circular configuration desired for the cross section of the commutator blank with the first end of the metal being positioned adjacent the second end of the metal in parallel, spaced relationship therewith, the spacing between the ends being such as to allow an electron beam welding operation to be performed therebetween;
electron beam welding the copper metal in the area of said two adjacent ends to form a welded joint therebetween both free from flash and having no upset thereby to form a circular extrusion blank, said electron beam welding operation being carried out in a vacuum of 10 to 100 microns;
preparing said circular blank for an extrusion operation;
inserting said circular blank into an extrusion press; and
extruding said circular blank thereby to elongate the metal and form the commutator blank of circular cross section.

6. The method of forming a relatively straight length of copper metal having first and second end surfaces into a commutator blank of circular cross section as defined in claim 5 wherein:
said forming step is carried out by initially bending the straight length of copper metal into a "Lazy W" configuration and thereafter bending the copper metal into a circular configuration; and wherein
said preparing step is carried out by initially annealing said circular extrusion blank and thereafter etching and applying a soap solution to the surfaces of said circular extrusion blank.

7. A method of forming relatively straight lengths of weldable metal into an elongated member of prescribed cross section which comprises the steps of:
forming the straight lengths of metal into a prescribed configuration with selected surface areas of the lengths of metal being positioned closely adjacent other selected surface areas of other of the lengths of metal in parallel, spaced relationship therewith, the spacing between said areas being such as to allow an electron beam welding operation to be performed therebetween;
electron beam welding the areas where the lengths of metal are closely adjacent one another thereby to form a welded joint at each of said areas whereby an extrusion blank is formed;
inserting said blank into an extrusion press; and
extruding said blank so as to form the elongated member of desired cross section.

8. A method of forming a relatively straight length of weldable metal into an elongated member which comprises the steps of:
forming the metal into a closed loop with a first selected surface area of the metal being positioned adjacent a second selected surface area of the metal in parallel, spaced relationship therewith, the spacing between said areas being such as to allow an electron beam welding operation to be performed therebetween;
electron beam welding the metal in the area of said two selected, adjacent surfaces to form a welded joint therebetween thereby to form an extrusion blank;
inserting said blank into an extrusion press; and
extruding said blank thereby to elongate the metal and form the member.

References Cited

UNITED STATES PATENTS

| | | | |
|---|---|---|---|
| 2,104,141 | 1/1938 | Stevens | 29—597 |
| 2,976,611 | 3/1961 | Giffen | 29—480 X |
| 2,987,610 | 6/1961 | Steigerwald. | |
| 3,159,911 | 12/1964 | Albert | 29—471.1 |
| 3,161,950 | 12/1964 | Cobb | 29—498 X |
| 3,229,353 | 1/1966 | Morrison | 29—477 X |

FOREIGN PATENTS 547,141     1956     Italy.

JOHN F. CAMPBELL, *Primary Examiner.*

R. F. DROPKIN, *Assistant Examiner.*

U.S. Cl. X.R.

29—477, 480, 486, 494, 498, 597.